US010460027B2

(12) United States Patent
Brissette et al.

(10) Patent No.: US 10,460,027 B2
(45) Date of Patent: *Oct. 29, 2019

(54) DATA FILTERING BASED ON A CELL ENTRY

(71) Applicant: International Business Machines Corporation, Armonk, NY (US)

(72) Inventors: Ryan L Brissette, San Jose, CA (US); Sameer V Jorapur, Santa Clara, CA (US); Somil Kulkarni, San Jose, CA (US); Michael L Pauser, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/052,456

(22) Filed: Feb. 24, 2016

(65) Prior Publication Data

US 2016/0170954 A1 Jun. 16, 2016

Related U.S. Application Data

(63) Continuation of application No. 13/652,337, filed on Oct. 15, 2012, now Pat. No. 9,286,284.

(51) Int. Cl.
*G06F 17/00* (2019.01)
*G06F 17/24* (2006.01)
*G06F 3/0482* (2013.01)
*G06F 17/22* (2006.01)
*G06F 3/0481* (2013.01)

(52) U.S. Cl.
CPC .......... *G06F 17/246* (2013.01); *G06F 3/0482* (2013.01); *G06F 3/04817* (2013.01); *G06F 17/2235* (2013.01)

(58) Field of Classification Search
CPC .............. G06F 17/2235; G06F 17/246; G06F 17/30896; G06F 3/0482; G06F 3/04817
See application file for complete search history.

(56) References Cited

U.S. PATENT DOCUMENTS

| 5,396,621 | A | | 3/1995 | MacGregor et al. |
| 5,721,847 | A | * | 2/1998 | Johnson ................ G06F 3/0481 715/209 |
| 6,006,239 | A | * | 12/1999 | Bhansali ................ G06F 17/246 |
| 6,101,493 | A | * | 8/2000 | Marshall ................ G06F 16/26 |

(Continued)

OTHER PUBLICATIONS

"User Interface (UI) Icon Cloud for an OS Application Frequency Presentation" IP.com, IPCOM000199087D, (Aug. 25, 2010), 3 pages.

(Continued)

*Primary Examiner* — Maikhanh Nguyen
(74) *Attorney, Agent, or Firm* — Kunzler Bean & Adamson; Bruce R. Needham

(57) ABSTRACT

A data filtering system includes a display device and a data filtering engine coupled to the display device. The data filtering engine is configured to display a cell set containing data of a common data type on a display device with at least one cell containing a cell entry. The data filtering engine is further configured to display a filter icon within at least one cell of the cell set and apply a filter to the cell set in response to selection of the filter icon by a user.

7 Claims, 5 Drawing Sheets

(56) References Cited

U.S. PATENT DOCUMENTS

| | | | |
|---|---|---|---|
| 6,326,962 B1* | 12/2001 | Szabo | G06F 16/2428 |
| | | | 715/762 |
| 6,694,326 B2 | 2/2004 | Mayhew et al. | |
| 6,738,770 B2 | 5/2004 | Gorman | |
| 6,988,241 B1 | 1/2006 | Guttman et al. | |
| 7,139,762 B2 | 11/2006 | Labarge et al. | |
| 7,146,561 B2* | 12/2006 | Bauchot | G06F 17/246 |
| | | | 715/212 |
| 7,203,694 B2 | 4/2007 | Gwizdaloski | |
| 7,216,291 B2 | 5/2007 | Kim | |
| 7,356,779 B2* | 4/2008 | Cras | G06F 17/30395 |
| | | | 707/999.102 |
| 7,451,397 B2 | 11/2008 | Weber | |
| 7,480,675 B2 | 1/2009 | Folting et al. | |
| 7,634,730 B2* | 12/2009 | Weber | G06F 17/246 |
| | | | 715/212 |
| 7,698,287 B2 | 4/2010 | Becker et al. | |
| 7,814,093 B2 | 10/2010 | Meyers et al. | |
| 7,831,539 B2 | 11/2010 | Folting et al. | |
| 7,849,395 B2 | 12/2010 | Ellis et al. | |
| 7,853,606 B1* | 12/2010 | Marmaros | G06F 17/30861 |
| | | | 707/769 |
| 8,091,044 B2* | 1/2012 | Haynes | G06F 3/0481 |
| | | | 707/999.003 |
| 8,095,866 B2 | 1/2012 | Folting et al. | |
| 8,423,909 B2* | 4/2013 | Zabielski | G06F 17/246 |
| | | | 715/212 |
| 8,745,482 B2 | 6/2014 | Ellis et al. | |
| 9,424,244 B2 | 8/2016 | Brissette | |
| 2002/0054141 A1 | 5/2002 | Yen et al. | |
| 2002/0120604 A1 | 8/2002 | Labarge et al. | |
| 2002/0156794 A1 | 10/2002 | Mayhew et al. | |
| 2003/0229848 A1* | 12/2003 | Arend | G06F 16/00 |
| | | | 715/227 |
| 2005/0039033 A1 | 2/2005 | Meyers et al. | |
| 2005/0102273 A1* | 5/2005 | Gupta | G06F 17/30525 |
| 2005/0114305 A1* | 5/2005 | Haynes | G06F 3/0481 |
| 2006/0074866 A1 | 4/2006 | Chamberlain et al. | |
| 2006/0074879 A1* | 4/2006 | Covington | G06F 17/30398 |
| 2006/0075328 A1 | 4/2006 | Becker et al. | |
| 2006/0129914 A1* | 6/2006 | Ellis | G06F 3/04847 |
| | | | 715/275 |
| 2006/0224568 A1 | 10/2006 | Debrito | |
| 2006/0287998 A1 | 12/2006 | Folting et al. | |
| 2007/0061698 A1* | 3/2007 | Megiddo | G06F 17/2247 |
| | | | 715/210 |
| 2008/0163091 A1 | 7/2008 | Busse | |
| 2009/0172516 A1* | 7/2009 | Gill | G06F 9/453 |
| | | | 715/228 |
| 2009/0276691 A1* | 11/2009 | Galuten | G06F 17/30011 |
| | | | 715/217 |
| 2009/0282354 A1* | 11/2009 | Poulson | G06F 17/246 |
| | | | 715/769 |
| 2009/0327852 A1* | 12/2009 | MacGregor | G06F 17/245 |
| | | | 715/214 |
| 2010/0325526 A1* | 12/2010 | Ellis | G06F 17/246 |
| | | | 715/217 |
| 2011/0167385 A1 | 7/2011 | Charrue et al. | |
| 2011/0219291 A1* | 9/2011 | Lisa | G06F 17/30651 |
| | | | 715/207 |
| 2011/0276917 A1 | 10/2011 | Error | |
| 2011/0270876 A1* | 11/2011 | Gill | G06F 17/30634 |
| | | | 707/769 |
| 2012/0023449 A1 | 1/2012 | Zabielski | |
| 2012/0079363 A1 | 3/2012 | Folting et al. | |
| 2013/0007645 A1* | 1/2013 | Kurniawan | G06F 3/04847 |
| | | | 715/769 |
| 2014/0019842 A1 | 1/2014 | Montagna | |

OTHER PUBLICATIONS

"A New User Interface Metaphor for Sorting and Filtering Files Using an Accelerometer Equipped Device" IP.com, IPCOM000191481D, (Jan. 5, 2010), 3 pages.
U.S. Appl. No. 14/057,774, filed Oct. 18, 2013, Notice of Allowance.
U.S. Appl. No. 13/652,337, filed Feb. 3, 2015, Notice of Allowance.
U.S. Appl. No. 13/652,337, filed Feb. 3, 2015, Final Office Action.
U.S. Appl. No. 14/057,774, filed Oct. 18, 2013, Office Action.
U.S. Appl. No. 14/057,774, filed Oct. 18, 2013, Final Office Action.
U.S. Appl. No. 13/652,337, filed Feb. 3, 2015, Office Action.
U.S. Appl. No. 15/240,880, filed Aug. 18, 2016, Office Action.
Using Filters in Excel 2010, 2010, The University of Edinburgh, pp. 4 (Year: 2010).
Bill Jelen, "AutoFilter Secrets in Excel", Dec. 2008, pp. 2 (Year: 2008).
U.S. Appl. No. 15/240,880, filed Aug. 18, 2016, Office Action dated Oct. 19, 2018.
U.S. Appl. No. 15/240,880, filed Aug. 18, 2016, Final Office Action.

\* cited by examiner

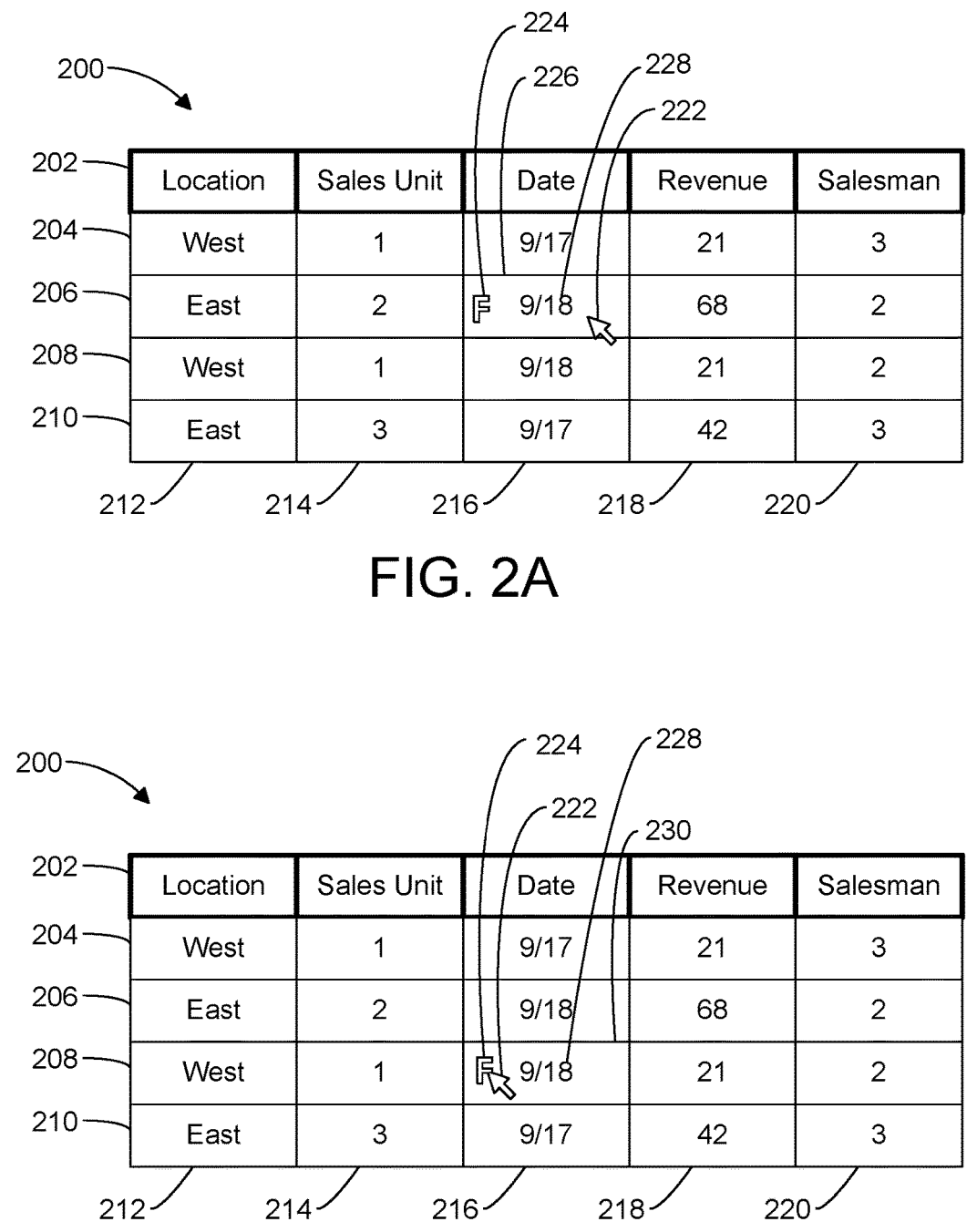

| Location | Sales Unit | Date | Revenue | Salesman |
|----------|-----------|------|---------|----------|
| West | 1 | 9/17 | 21 | 3 |
| East | 2 | 9/18 | 68 | 2 |
| West | 1 | 9/18 | 21 | 2 |
| East | 3 | 9/17 | 42 | 3 |

FIG. 2A

| Location | Sales Unit | Date | Revenue | Salesman |
|----------|-----------|------|---------|----------|
| West | 1 | 9/17 | 21 | 3 |
| East | 2 | 9/18 | 68 | 2 |
| West | 1 | 9/18 | 21 | 2 |
| East | 3 | 9/17 | 42 | 3 |

FIG. 2B

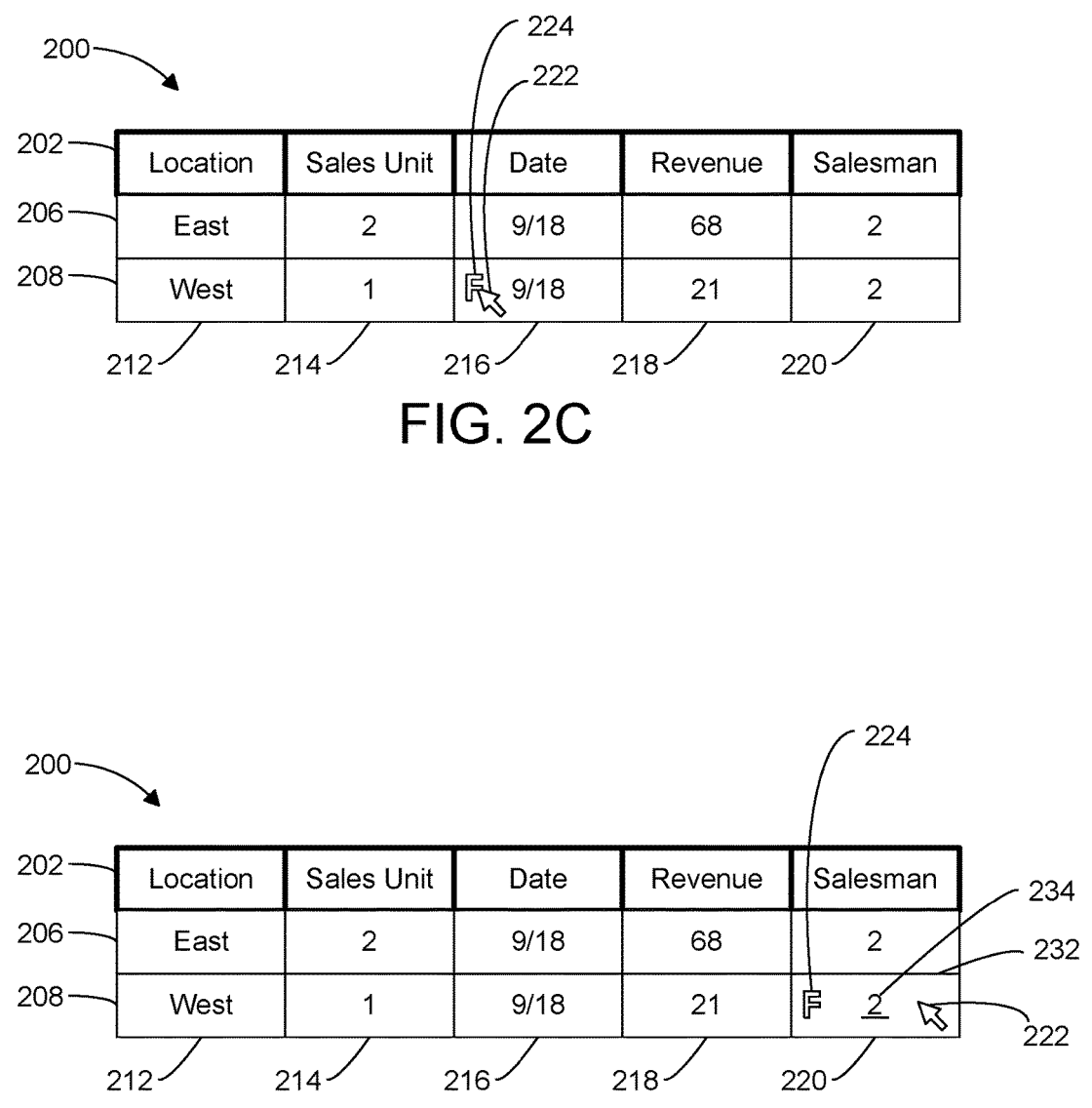

| | Location | Sales Unit | Date | Revenue | Salesman |
|---|---|---|---|---|---|
| | East | 2 | 9/18 | 68 | 2 |
| | West | 1 | 9/18 | 21 | 2 |

FIG. 2C

| | Location | Sales Unit | Date | Revenue | Salesman |
|---|---|---|---|---|---|
| | East | 2 | 9/18 | 68 | 2 |
| | West | 1 | 9/18 | 21 | 2 |

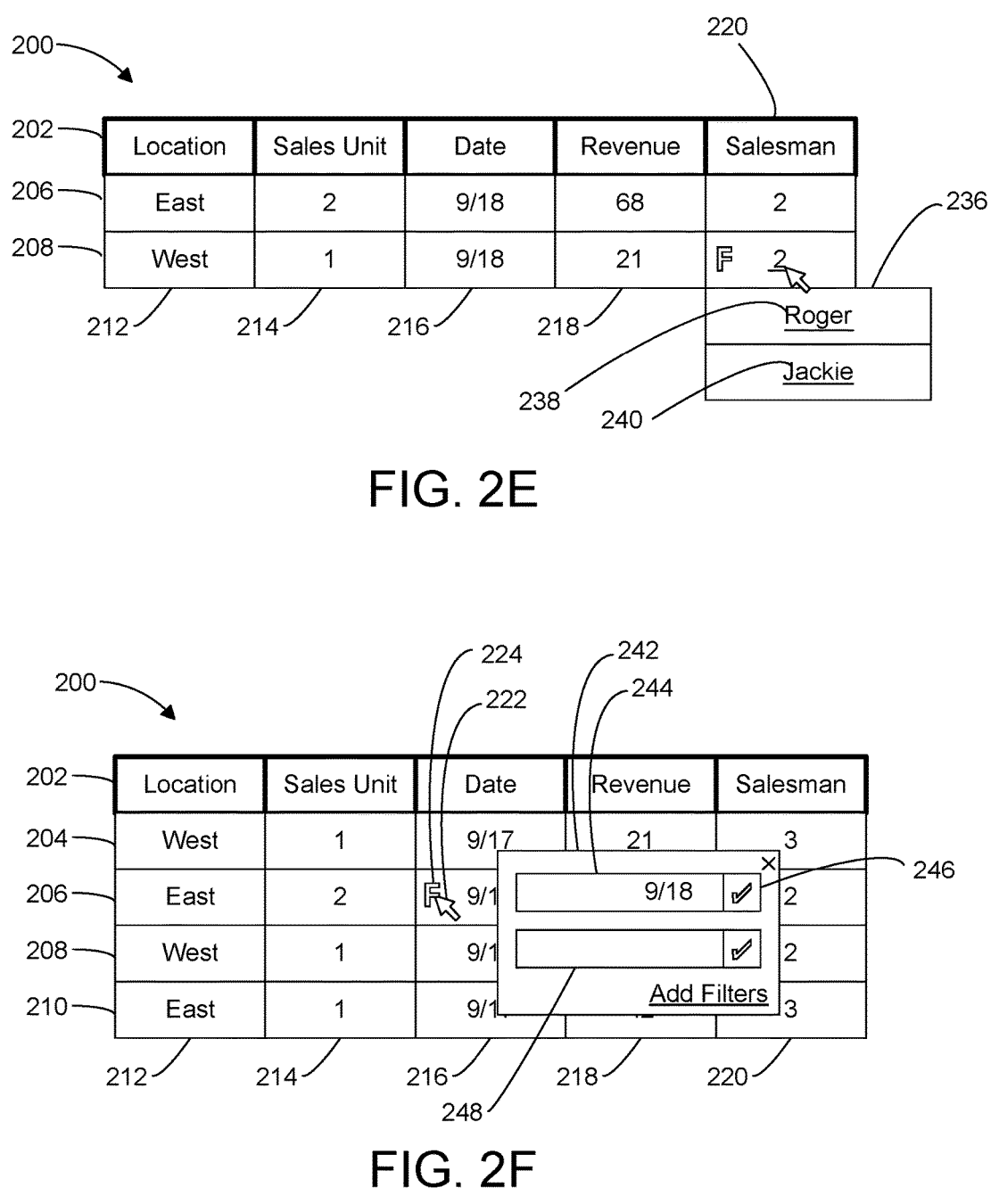

| Location | Sales Unit | Date | Revenue | Salesman |
|---|---|---|---|---|
| East | 2 | 9/18 | 68 | 2 |
| West | 1 | 9/18 | 21 | 2 |

Roger
Jackie

FIG. 2F

| Location | Sales Unit | Date | Revenue | Salesman |
|---|---|---|---|---|
| West | 1 | 9/17 | 21 | 3 |
| East | 2 | 9/1 | | 2 |
| West | 1 | 9/1 | | 2 |
| East | 1 | 9/1 | | 3 |

9/18 ✓
_____ ✓
Add Filters

DATA FILTERING BASED ON A CELL ENTRY

CROSS-REFERENCE TO RELATED APPLICATIONS

This application is a continuation of U.S. application Ser. No. 13/652,337, filed on Oct. 15, 2012, which is incorporated by reference herein in its entirety.

BACKGROUND

Users may be inundated with massive amounts of data making it difficult to manage and harness the data effectively. Users can easily suffer from information overload. Data formatted in grids or other arrangements may be unmanageable, making the data ineffective for the user. Tools and functions have been developed to allow users to manipulate the presentation and display of the data to better understand the data. Filtering data is one such important function, helping users focus attention on data that fits the particular criteria of the filter. Typically a user selects a menu option to apply filtering. A filter dialog box then appears and the user inputs the right spelling or capitalization to accurately filter the data. This conventional filtering process is time consuming and susceptible to user input errors, especially for users that filter data repeatedly.

SUMMARY

Embodiments of a system are described. In one embodiment, a data filtering system includes a display device and a data filtering engine coupled to the display device. The data filtering engine is configured to display a cell set of a common data type with at least one cell containing a cell entry. The data filtering engine is further configured to display a filter icon within at least one cell of the cell set and apply a filter to the cell set in response to selection of the filter icon by a user. Other embodiments of the system are also described, as well as embodiments of a system and a method.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 2A depicts one embodiment of a data set configured in rows and columns with a filter icon displayed within a cell.

FIG. 2B depicts the data set of FIG. 2A with the cursor moved and the filter icon displayed in a different cell.

FIG. 2C depicts the data set of FIGS. 2A and 2B with the data set filtered according to the cell entry.

FIG. 2D depicts the data set of FIG. 2C with a cell entry shown as a hyperlink.

FIG. 2E depicts the data set of FIG. 2D and the metadata associated with the cell entry.

FIG. 2F depicts the data set of FIG. 2A and a filter dialog containing an entry field automatically populated with a cell entry.

Throughout the description, similar reference numbers may be used to identify similar elements.

DETAILED DESCRIPTION

Figure 1:
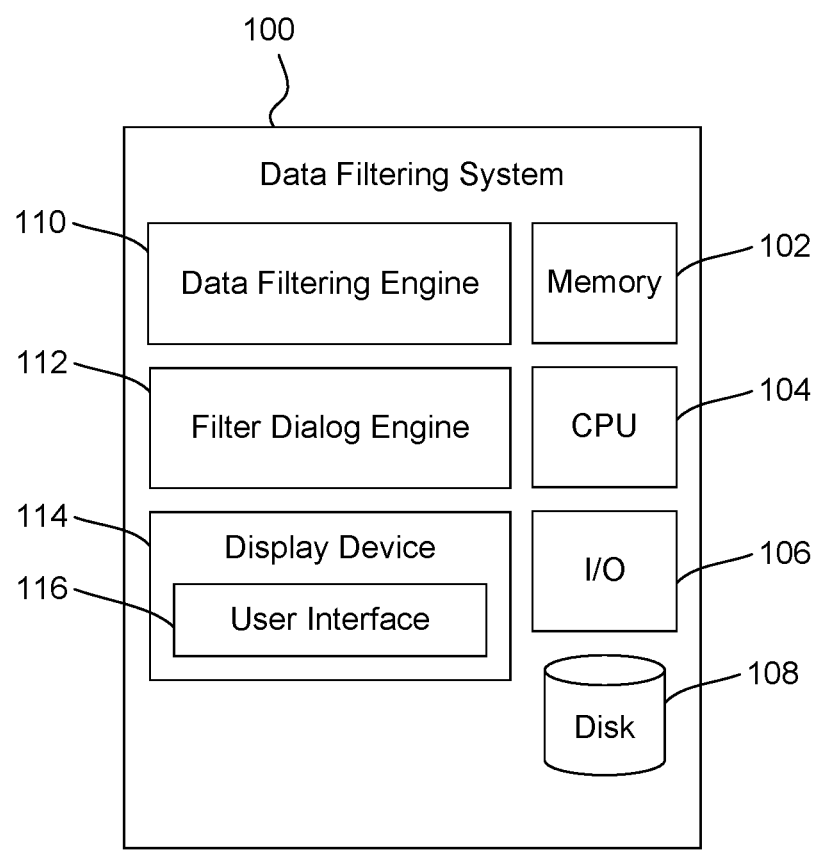
FIG. 1 depicts a schematic diagram of one embodiment of a data filtering system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments facilitate filtering data quickly and efficiently. In many instances, it is difficult to efficiently and accurately filter data. Tables and spreadsheets today may contain tens of thousands of cells or more. Filters allow users to understand, interpret, and analyze subsets of data within a table or spreadsheet by locating or displaying only the data that satisfies the filter.

Applying a conventional filter typically involves a user selecting a filter option on the menu of an application. Upon selection, a dialog box prompts the user to input the desired filter language. For users continually applying filters, this process can be time consuming and frustrating. In addition, the user typically manually inputs the correct filter language or criteria. The user needs to be familiar with the correct spelling and capitalization to correctly apply the filter. The user may just enter a typo. Incorrect capitalization or a misspelled word leads to user frustration and inefficiency or worse. A user unaware of a misspelled filter may reach incorrect conclusions based on an incorrect filtered data set.

Some embodiments described herein allow the user to apply a filter based on a cell value or cell entry without typing anything by selecting the filter icon within the cell. There is no opportunity to misspell the filter language. Some embodiments significantly reduce the time to apply a filter by applying after a single mouse-click or other user input. Accurate and quick application of filters reduces user frustration and increases user satisfaction. Users who apply filters continually do so quickly and efficiently.

FIG. 1 depicts a schematic diagram of one embodiment of a data filtering system 100. The depicted data filtering system 100 includes various components, described below, that are capable of performing the functions and operations described herein. The illustrated data filtering system 100 includes a computer memory device 102, a processing device 104, input/output devices 106, and a disk storage device 108. The illustrated data filtering system 100 also includes a data filtering engine 110, a filter dialog engine 112, and a display device 114. Some or all of the components of the data filtering system 100 may be stored on a single computing device or on a network of computing devices, including a wireless communication network. The data filtering system 100 may be a single device such as a mobile phone, a smart phone, a portable media device, a tablet computer, a laptop computer, a desktop computer, or other device or a combination of devices. Although the data filtering system 100 is shown and described with certain components and functionality, other embodiments of the data filtering system 100 may include fewer or more components to implement less or more functionality.

The computer memory device 102 may store data and/or software instructions or computer program instructions for carrying out the operations described herein. The computer memory device 102 may be external or internal to the computer system and may include but is not limited to a hard drive, a CD/DVD recordable drive, a magnetic tape drive, a disk cartridge drive, a secure digital card, another type of magnetic or optical drive, a solid-state drive, or another type of memory device. The processing device 104 is connected to and in communication with the memory device 102 and may store and access data on the memory device 102 for performing the operations described herein. The processor or processing device 104 may also be connected to the disk storage device 108. The disk storage device 108 may be implemented to temporarily store data or software instructions from the memory device 102 or the processor 104. The disk storage device 108 may include but is not limited to a hard disk drive, a floppy disk drive, a removable floppy disk, or other type of optical or magnetic drive. The functionality of the data filtering engine 110 and the filter dialog engine 112 may be implemented by computer program instructions stored on the computer memory device 102 and executed by the processing device 104 such as a CPU A user interface 116 is displayed on the display device 114. The display device 114 may be any display device 114 for a computing device. The user interface 116 may be part of an operating system for the computing device and may allow a user to interact with the operating system. The operations described herein may be associated with one or more applications configured to operate within the operating system.

In some embodiments, the data filtering engine 110 is configured to display a cell set containing data of a common data type. In some embodiments, at least one cell contains a cell entry. In some embodiments, the data filtering engine 110 is configured to display a data set comprising at least one cell set. In some embodiments, the data filtering engine 110 is further configured to display a filter icon within at least one cell of the cell set. A data set may be a database, a table, a spreadsheet, a relation, a data model, a file or other collection of data. A data model may be a flat model, a hierarchical model, a network model, a relational model, or another similar model. A data set may be configured in cells, lines of data, or otherwise. A data set may contain more than one cell set. A cell set is a subset of a data set. In some embodiments, a cell set may contain data of a common data type. A cell set may be a line of data, a row of data, a column of data, or another subset of a data set. A cell may be a data field, a field containing a data value, or another subset of a cell set. A cell entry may be any type of data including but not limited to a number, a letter, a word, a sentence, a symbol, a data value, a data field entry, or metadata, or a combination thereof.

In some embodiments, the filter icon may be another function to manage data including but not limited to sorting, filtering, summation, find and replace and so on. In some embodiments, the data filtering engine 110 is further configured to apply a filter to the cell set in response to a selection of the filter icon by a user. In some embodiments, the function of the filter is to distinguish filtered data from sifted data. The filter separates the unfiltered data into filtered data (or the desired data) and sifted data (or the undesired data). Unfiltered data is the data set or cell set before application of the filter. The filtered data is the unfiltered data that satisfies the filter language or criteria. The sifted data is the unfiltered data that does not satisfy the filter language or criteria. In some embodiments, the applied filter is the cell entry. In some embodiments, the filter is based on the cell entry. The filter criteria may include but is not limited to filtering for values equal to, greater than, less than, begins with etc.

The filtered data may be displayed in various formats. In some embodiments, the filtered data is exclusively displayed on the display device 114. In some embodiments, only the result cell set is displayed. In some embodiments, the result data set is displayed. In some embodiments, the filtered data is moved to an optimal location within the data set or cell set. In some embodiments, the filtered data moves to the top of the data set or cell set. In some embodiments, the result will be highlighted or otherwise visually emphasized.

In some embodiments, the data filtering engine 110 is further configured to apply additional filters. In some embodiments, the additional filter is applied in response to selection of a second filter icon displayed within at least a second cell of a second cell set. The filters may be associated with each other using logical operations well known including but not limited to and, or, not, nor, equals, less than, greater than, and so on. In some embodiments, the data filtering engine 110 is further configured to display the cell entry as a hyperlink. The hyperlink links to metadata associated with the cell entry. In some embodiments, the data filtering engine 110 is further configured to display the metadata associated with the cell entry in response to selection of the hyperlink.

In some embodiments, the data filtering system 100 includes the filter dialog engine 112. In some embodiments, the filter dialog engine 112 is configured to display a filter dialog in response to the selection of the filter icon by the user. In some embodiments, the filter dialog is automatically populated with the cell entry. The filter dialog may be configured to filter according to many different criteria. The criteria may include but is not limited to filtering for values equal to, greater than, less than, begins with etc. In some embodiments, the filter dialog includes additional entry fields that may be applied to the data set. In some embodiments, the filter dialog is configured to allow the user to input additional filters in to the additional entry fields.

FIG. 2A depicts one embodiment of a data set 200 configured in rows 202-210 and columns 212-220 with a filter icon 224 displayed within a cell 226. In some embodiments, the data set 200 is displayed on the user interface 116 of the display device 114. In this embodiment, the first row 202 of the data set 200 contains column headings. In this embodiment, the remaining rows 204-210 are groups of related data, known as a record, tuple or other set of related data. The rows 204-210 contain data that may be filtered. In this embodiment, the data set 200 is sales information. The data in each row 204-210 relate to sales transactions, with each attribute of the transaction aligned under columns 212-220. In this embodiment, the columns 212-220 are cell sets 212-220. The sales information includes the location of a sale, the sales unit involved, the date of the sale, the revenue generated, and the number of salesmen involved in the sale. For simplicity, a small data set 200 is shown in FIGS. 2A-2F. In this embodiment, the filter functionally allows a user to view only the sales information of a single region (e.g. East or West), a single sales unit (e.g. 1, 2, or 3), or a single date (e.g. 9/17 or 9/18), etc. A filter allows the user to focus attention on a subset of data while ignoring the rest. FIG. 2A also depicts a cursor 222 located in a cell 226 and a filter icon 224 located at a left perimeter of the cell 226. The cell 226 contains a cell entry 228 of "9/18." Although the filter icon 224 is shown with a specific graphical depiction—a block letter F—other embodiments may utilize other graphical or visual elements to represent the filter icon 224 in the cell 226. In other embodiments, the filter icon 224 may be located anywhere in the cell 226 or only partially in the cell 226.

FIG. 2B depicts the data set 200 of FIG. 2A with the cursor 222 moved and the filter icon 224 displayed in a different cell 230. In this embodiment, the user has moved the cursor 222 to a new cell 230, and the filter icon 224 disappears from the cell 226 and displays in the cell 230. In some embodiments, the filter icon 224 appears when the cursor 222 hovers over the cell 230 for a period of time. In some embodiments, the filter icon 222 will disappear from the cell 226 when the cursor 222 leaves the cell 226, appearing in the cell 230 where the cursor 222 relocates. In some embodiments, the filter icon 224 is displayed in all cells of the data set 200 regardless of the location of the cursor 222. In some embodiments, the filter icon 222 is displayed only in cells containing a cell entry 228. Some embodiments do not include a cursor 222.

FIG. 2C depicts the data set 200 of FIGS. 2A and 2B with the data set 200 filtered according to the cell entry 228. The data set 200 has been filtered upon selection of the filter icon 224. In this embodiment, the cell set 216 is filtered for data equaling the cell entry 228. Cells 226 and 230 are displayed along with the related data in rows 206 and 208. In other embodiments, cells 226 and 230 are exclusively displayed. In this embodiment the filtered data 206 and 210 is distinguished from the sifted data 204 and 210. The sifted data 204 and 210 do not contain a data satisfying the filter. In some embodiments, the selection of the filter icon 224 may be a single mouse click. Some embodiments include a touch screen and selection of the filter icon 224 may be a single tap of the filter icon 224. The filtered data set 200 shows only rows 206 and 208, the rows satisfying the filter "9/18." Rows 204 and 210 are excluded because they do not satisfy the cell entry 228, "9/18." In this embodiment, only the filtered data will be displayed. In some embodiments, the filtered data will relocate to the top of the data set 200. In some embodiments, the filtered data will be highlighted or otherwise visually emphasized.

FIG. 2D depicts the data set 200 of FIG. 2C with a cell entry 232 shown as a hyperlink. In this embodiment, the cursor 222 has moved to a different cell 234. The filter icon 224 is displayed in cell 234 and the cell entry 232 is displayed as a hyperlink. In some embodiments, the cell entry 232 is metadata. In some embodiments, when the cell entry 232 is metadata, the cell entry 232 is displayed as a hyperlink. The hyperlink links to the data associated with the metadata. In some embodiments, the cell entry 232 displays as a hyperlink after the cursor 222 hovers over the cell 234 for a period of time. In some embodiments, each cell entry 232 that supports linking to further data is displayed as a hyperlink regardless of the location of the cursor 222. Some embodiments do not include the cursor 222.

FIG. 2E depicts the data set 200 of FIG. 2D and the metadata 236 associated with the cell entry 232. In this embodiment, the metadata 236 is displayed below the cell 234. In some embodiments, the metadata 236 is a separate database, table, spreadsheet, or other collection of data located in a distinct file. In some embodiments, the metadata 236 is a separate sheet, database, or table located in the same file. In some embodiments, the metadata 236 resides in a different application. In this embodiment, the metadata 236 associated with the cell entry 232 (i.e. "2") are the names of the two salesmen responsible for the sale (i.e. "Roger" and "Jackie"). In some embodiments, the metadata 236 is displayed in different ways. The metadata 236 may be displayed in a different location within data set 200 or may be displayed as a pop-up window. The metadata 236 may be displayed within the same cell as the original cell entry 232 in which the metadata 236 is associated or may be displayed in an entirely different format. In this embodiment, the cell entries 238 and 240 are also displayed as hyperlinks. The cell entries 238 and 240 link to further data detailing each cell entry, respectively. In some embodiments, the user may drill down on multiple levels of data quickly and efficiently with a single click of a hyperlink.

FIG. 2F depicts the data set 200 of FIG. 2A and a filter dialog 242 containing an entry field 244 automatically populated with the cell entry 228. In this embodiment, the filter dialog 242 is displayed in response to the selection of the filter icon 224. In this embodiment, the filter dialog entry field 244 is automatically populated with the cell entry 228. In some embodiments, the filter dialog 242 is configured to filter for values equal to the cell entry 228. In other embodiments, the filter dialog 242 is configured to filter for values less than or more than the value of the cell entry 228. In some embodiments, the filter dialog 242 is configured to filter for values that begin with the cell entry 228 and so on. In some embodiments, the filter dialog 242 includes an execute button 246 that when selected applies the filter. In some embodiments, the user may change or alter the automatically populated value of the entry field 244. In some embodiments, the filter dialog 242 includes additional entry fields 248 enabling application of additional filters. In some embodiments, the additional entry filed 248 is automatically populated according to other cell entries 228 of the data set 200 or cell set 216. In some embodiments, the filter dialog 242 is displayed in a separate window, in a pop-up, in a ribbon of an application, in a menu, or otherwise similarly displayed.

In addition to the advantages which may be achieved by implementation of the individual components of the data filtering system 100, some embodiments of the data filtering system 100 provide additional advantages over conventional technology. For example, some embodiments of the data filtering system 100 allow a user to quickly apply a filter with a single mouse click. Some embodiments reduce or eliminate the possibility of an error in spelling or capitalization by basing the filter on the cell entry. In some embodiments, filters are applied without typing a single keystroke.

Figure 3:
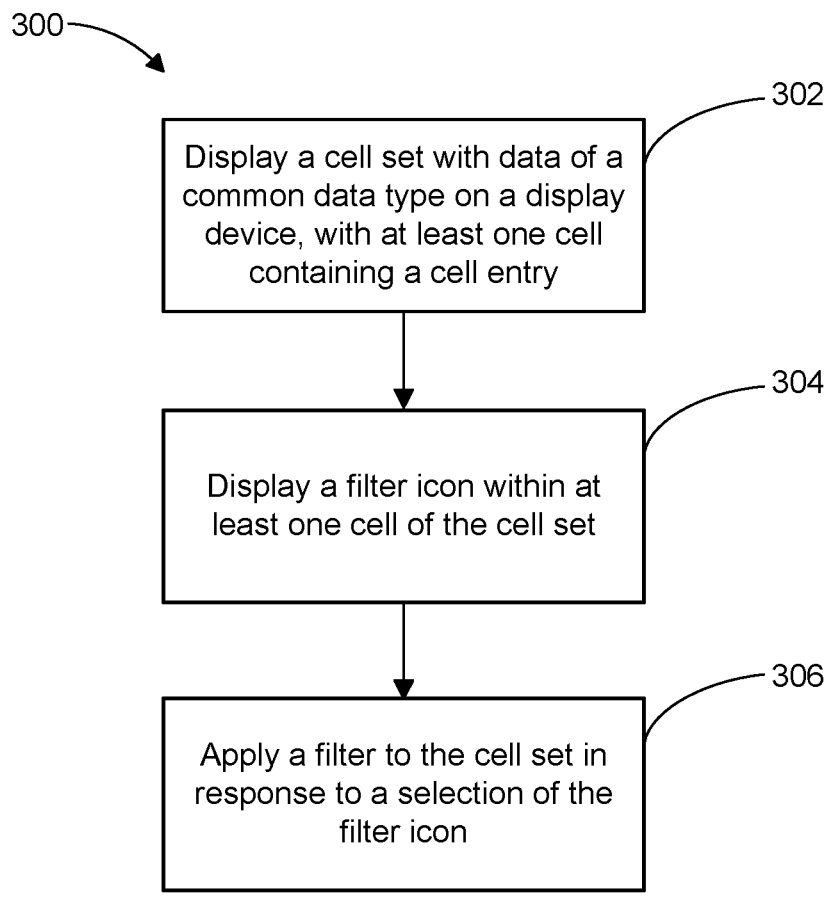
FIG. 3 depicts a flow chart diagram of one embodiment of a method for data filtering.

FIG. 3 depicts a flow chart diagram of one embodiment of a method for data filtering 300. Although the method for data filtering 300 is described in conjunction with the data filtering system 100 of FIG. 1 and the data set 200 of FIGS. 2A-2F, embodiments of the method for data filtering 300 may be implemented with other types of computer systems.

At 302, a cell set 216 is displayed on a display device 114. The cell set 216 contains data of a common data type and at least one cell 226 contains a cell entry 228. At 304, a filter icon 224 is displayed within at least one of the cells 226 of the cell set 216. At 306, a filter is applied to the cell set 216 in response to selection of the filter icon 224. The depicted method for data filtering 300 then ends.

In some embodiments, the filter is based on the cell entry 228. Some embodiments include distinguishing filtered data 206-208 that fulfills a logical rule relating the filtered data 206-208 and the cell entry 228 from sifted data 204 & 210 that does not fulfill the logical rule relating the sifted data 204 & 210 and the cell entry 228. Distinguishing may include exclusively displaying, moving, or otherwise visually emphasizing the filtered data 206-208. In some embodiments, only the cell set 216 is displayed. In other embodiments, the data set 200 is displayed showing the related data of cell sets 212-214 and 218-220. In some embodiments, the data set 200 is filtered for the exact value of the cell entry 228. In some embodiments, the data set 200 is filtered for values greater than or less than the value of the cell entry 228. In some embodiments, the data set 200 is filtered for a range of values above and/or below the value of the cell entry 228. In some embodiments, the data set 200 is filtered for similar values as the cell entry 228 or values that begin with the cell entry 228. In some embodiments, only the cell set 216 is filtered.

In some embodiments, the method for data filtering 300 further includes displaying a filter dialog 242 in response to the selection of the filter icon 224 by the user. In some embodiments, the filter dialog entry field 244 is automatically populated with the cell entry 228. The filter may be configured to filter according to many different criteria. The criteria may include but is not limited to filtering for values equal to, greater than, less than, begins with and so on. In some embodiments, the filter dialog 242 includes additional entry fields 248 that allow additional filters to be applied to the data set 200.

In some embodiments, the method for data filtering 300 includes applying additional filters to the data set 200 by selecting a second filter icon 224 displayed within at least a second cell 232 of a second cell set 220. The additional filters may be associated with each other using logical operations well known in the art including but limited to and, or, not, nor, equals, less than, greater than, and so on.

In some embodiments, the selection of the filter icon 224 is in response to a single user input. The input may be a single mouse click, a right-click, a left-click, a tap or other recognized touch gesture on a touch screen, a keystroke, a keyboard input, or another analogous single input. Some embodiments described herein increase efficiency by decreasing the time and/or the number of inputs required to apply a filter. In some embodiments, a single click of the filter icon 224 will apply a filter based on the cell entry 228.

In some embodiments, the filter icon 224 will appear within at least one cell 226 of the cell set 216 when the cursor 222 or an analogous pointer hovers over the cell 226 for a period of time. In some embodiments, the filter icon 224 is displayed in all cells 226 of the cell set 216 or the data set 200. In some embodiments, the filter icon 224 is displayed only in cells 226 that contain a cell entry 228.

Some embodiments of the method for data filtering 300 further include displaying a data set 200 including a plurality of cell sets 212-220. In some embodiments, the method for data filtering 300 includes applying at least one additional filter in response to a user input, the user input being selection of a second filter icon 224 displayed within at least a second cell 232 of a second cell set 220.

In some embodiments, the method for data filtering 300 further includes displaying the cell entry 234 as a hyperlink. In some embodiments, the hyperlink links to metadata 236 associated with the cell entry 234. In some embodiments, the metadata 236 is displayed in response to selection of the hyperlink. The metadata 236 may be displayed within the data set 200, within the cell set 220, as a pop-up box, in a separate file, in a separate window, or in another way. In some embodiments, the hyperlink is displayed when the cursor 222 or similar pointer hovers over the cell 232 for a period of time. In other embodiments, all cell entries 234 that link to metadata 236 are shown as hyperlinks.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

An embodiment of a system for data filtering includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising a non-transitory computer useable storage medium including a computer readable program, wherein the computer readable program includes instructions that, When executed by a processing device within a computer, cause the computer to perform operations comprising:
  displaying a cell set comprising data of a common data type on a display device, wherein at least one cell of the cell set contains a cell entry;
  displaying a filter icon within at least one cell of the cell set that includes a cell entry in response to one or more of a cursor hovering over the cell and the cell being selected;
  applying a filter to the cell set in response to selection of the filter icon by a user, the data in the cell set filtered by the cell entry of the cell comprising the filter icon that is selected such that only cells of the cell set that comprise data that equals the data of the cell entry are displayed, along with data related to the displayed cells;
  displaying a filter dialog in response to the selection of the filter icon by the user, wherein the filter dialog is populated automatically with the cell entry; and
  applying at least one additional filter in response to a user input entered into the filter dialog.

2. The computer program product of claim 1, wherein applying the filter comprises distinguishing on the display device filtered data that fulfills a logical rule relating the filtered data and the cell entry from sifted data that does not fulfill the logical rule relating the sifted data and the cell entry.

3. The computer program product of claim 1, wherein the operations further comprise: displaying the cell entry as a hyperlink, wherein the hyperlink links to metadata associated with the cell entry, and displaying the metadata associated with the cell entry in response to a selection of the hyperlink.

4. The computer program product of claim 1, wherein the displaying the filter icon is in response to a pointer hovering over the cell.

5. A data filtering system comprising:
  at least one processor;
  a display device comprising a user interface, and
  a data filtering engine coupled to the display device, the data filtering engine executed by the at least one processor to:
  display a cell set comprising data of a common data type on a display device, wherein at least one cell of the cell set contains a cell entry;
  display a filter icon within at least one cell of the cell set that includes a cell entry in response to one or more of a cursor hovering over the cell and the cell being selected;
  apply a filter to the cell set in response to selection of the filter icon by a user, the data in the cell set filtered by the cell entry of the cell comprising the filter icon that is selected such that only cells of the cell set that comprise data that equals the data of the cell entry are displayed, along with data related to the displayed cells;
  display a filter dialog in response to the selection of the filter icon by the user, wherein the filter dialog is populated automatically with the cell entry; and
  apply at least one additional filter in response to a user input entered into the filter dialog.

6. The system of claim 5, wherein application of the filter comprises distinguishing on the display device filtered data that fulfills a logical rule relating the filtered data and the cell entry from sifted data that does not fulfill the logical rule relating the sifted data and the cell entry.

7. The system of claim 5, wherein the data filtering engine is further configured to: display the cell entry as a hyperlink, wherein the hyperlink links to metadata associated with the cell entry, and display the metadata associated with the cell entry in response to a selection of the hyperlink.

\* \* \* \* \*